(12) United States Patent
Tang et al.

(10) Patent No.: US 7,327,673 B1
(45) Date of Patent: Feb. 5, 2008

(54) ASYMMETRIC DIGITAL SUBSCRIBER LINE PROVISION FLOW CONTROL ON DIGITAL SUBSCRIBER LINE ACCESS MULTIPLEXER SWITCHES

(75) Inventors: Harry Tang, Atlanta, GA (US); M. Jeff Wilson, Duluth, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 1151 days.

(21) Appl. No.: 09/943,956

(22) Filed: Aug. 31, 2001

(51) Int. Cl.
  *G01R 31/08* (2006.01)
(52) U.S. Cl. .................. 370/229; 370/352; 370/354; 370/465; 370/463
(58) Field of Classification Search ........ 370/352–356, 370/465, 463, 229
  See application file for complete search history.

(56) References Cited

U.S. PATENT DOCUMENTS

| | | | | |
|---|---|---|---|---|
| 3,891,974 | A * | 6/1975 | Coulter et al. ............... | 703/23 |
| 4,493,076 | A * | 1/1985 | Khimeche et al. ............ | 714/11 |
| 5,915,011 | A * | 6/1999 | Miloslavsky ................. | 379/219 |
| 6,269,330 | B1 * | 7/2001 | Cidon et al. ................. | 714/43 |
| 6,363,421 | B2 * | 3/2002 | Barker et al. ................ | 709/223 |
| 6,404,861 | B1 * | 6/2002 | Cohen et al. ................ | 379/93.01 |
| 6,490,620 | B1 * | 12/2002 | Ditmer et al. ............... | 709/224 |
| 6,563,816 | B1 * | 5/2003 | Nodoushani et al. ........ | 370/352 |
| 6,580,727 | B1 * | 6/2003 | Yim et al. .................... | 370/463 |
| 6,597,689 | B1 * | 7/2003 | Chiu et al. ................... | 370/354 |
| 6,636,505 | B1 * | 10/2003 | Wang et al. .................. | 370/352 |
| 6,658,650 | B1 * | 12/2003 | Bates .......................... | 717/127 |
| 6,668,370 | B1 * | 12/2003 | Harmon et al. .............. | 717/125 |
| 6,798,744 | B1 * | 9/2004 | Loewen et al. .............. | 370/235 |
| 6,870,901 | B1 * | 3/2005 | Gudmundsson et al. ..... | 379/22 |
| 6,873,628 | B1 * | 3/2005 | Tang .......................... | 370/480 |
| 6,885,672 | B1 * | 4/2005 | Tang et al. .................. | 370/412 |
| 6,925,516 | B2 * | 8/2005 | Struhsaker et al. .......... | 710/301 |
| 6,981,039 | B2 * | 12/2005 | Cerami et al. ............... | 709/223 |

(Continued)

OTHER PUBLICATIONS

Efficient implementation of semaphores in controller area networks☐☐Cena, G.; Valenzano, A.; Industrial Electronics, IEEE Transactions on☐☐vol. 46, Issue 2, Apr. 1999 pp. 417-428.*

(Continued)

*Primary Examiner*—Edan Orgad
*Assistant Examiner*—Andrew C. Lee
(74) *Attorney, Agent, or Firm*—Merchant & Gould (57) ABSTRACT

Disclosed is a system for an ADSL access network for providing ADSL provision flow control at a DSLAM switch. The system includes an element management system in communication with a DSLAM switch; and a network management system in communication with the element management system, the network management system including a control algorithm for controlling ADSL provision flow on a DSLAM switch by introducing a two level semaphore including a first semaphore and a second semaphore. The first semaphore controls a first provision request flow at the element management system level and the second semaphore controls a second provision request flow at the DSLAM level. Disclosed is also a method of providing ADSL provision flow control at a DSLAM switch. The method includes at a DSLAM switch, receiving a provision request from a network management system; determining whether a DSLAM level semaphore is available at the DSLAM switch; determining whether an element management system level semaphore is available; and connecting the network management system to the DSLAM.

23 Claims, 4 Drawing Sheets

U.S. PATENT DOCUMENTS

| | | | |
|---|---|---|---|
| 2002/0023258 A1* | 2/2002 | Elwahab et al. | 717/122 |
| 2002/0032769 A1* | 3/2002 | Barkai et al. | 709/224 |
| 2002/0101864 A1* | 8/2002 | Teixeira | 370/360 |
| 2002/0168054 A1* | 11/2002 | Klos et al. | 379/1.04 |
| 2003/0041135 A1* | 2/2003 | Keyes et al. | 709/223 |
| 2003/0074463 A1* | 4/2003 | Swartz et al. | 709/230 |
| 2004/0039786 A1* | 2/2004 | Horvitz et al. | 709/207 |
| 2005/0174938 A1* | 8/2005 | Richardson et al. | 370/230.1 |
| 2006/0010471 A1* | 1/2006 | Zigmond | 725/51 |

OTHER PUBLICATIONS

Semaphore queue priority assignment for real-time multiprocessor synchronization☐☐Lortz, V.B.; Shin, K.G.; Software Engineering, IEEE Transactions on☐☐vol. 21, Issue 10, Oct. 1995 pp. 834-844. ☐☐*

Semaphore queues: modeling multilayered window flow control mechanisms☐☐Fdida, S.; Perros, H.G.; Wilk, A.; Communications, IEEE Transactions on☐☐vol. 38, Issue 3, Mar. 1990 pp. 309-317.*

Efficient implementation of semaphores in controller area networks Cena, G.; Valenzano, A.; Industrial Electronics, IEEE Transactions on vol. 46, Issue 2, Apr. 1999 pp. 417-428.*

Efficient implementation of semaphores in controller area networksCena, G.; Valenzano, A.; Industrial Electronics, IEEE Transactions onvol. 46, Issue 2, Apr. 1999 pp. 417-428.*

ADSL Tutorial, DSL Forum, Twisted Pair Access to the Information Highway, pp. 1-4, Jul. 27, 2001, http://www.adsl.com/adsl_tutorial.html.

Chapter 3, The Role of the DSLAM, pp. 1-2, Jul. 27, 2001, http://www.telebyteusa.com/dslprimer/dslch3.htm.

* cited by examiner

ASYMMETRIC DIGITAL SUBSCRIBER LINE PROVISION FLOW CONTROL ON DIGITAL SUBSCRIBER LINE ACCESS MULTIPLEXER SWITCHES

BACKGROUND

1. Technical Field

This invention relates generally to asymmetric digital subscriber line network management systems. More particularly, the invention relates to a system and method for operating a digital subscriber line access multiplexer for an asymmetric digital subscriber line network.

2. Description of Related Art

An Asymmetric Digital Subscriber Line (ADSL) is a modem technology for converting existing copper twisted-pair telephone lines into access paths for delivering broadband services such as multimedia and high-speed data communications to homes and small businesses. For home or small business use, subscribers tend to be more of a consumer of data rather than a producer of data. Therefore, slower upstream information speed can be traded off for faster downstream information speed. In other words, in an ADSL subscriber line network much greater bandwidth is available in the downstream direction rather than the upstream direction. An ADSL subscriber line can transmit up to 6 Mbps to a subscriber while it can transmit at 832 kbps or more bi-directionally over existing copper telephone lines. These data rates can expand existing access capacity fifty fold, thus enabling the transformation of existing public information networks without requiring new cabling. With ADSL technology, the existing public information networks, which are generally limited to voice, text and low resolution graphics, can be transformed into a system that is capable of bringing broadband services such as full motion video, to a subscriber's home or small business. See, for example, Twisted Pair Access to the Information Superhighway, at www.telebyteusa.com/dslprimer/dslch3.htm which is herein incorporated by reference in its entirety.

A Digital Subscriber Line Access Multiplexer (DSLAM) switch provides high-speed data transmission over existing copper telephone lines. A DSLAM switch separates the voice frequency signals from the high-speed data traffic, controls and routes traffic in an ADSL subscriber line between the subscriber's end-user equipment such as a router, modem or network interface card, and the network service provider's network. In general, a DSLAM switch aggregates multiple subscriber lines at an input portion into a single output for network connection. See, for example, *The Role of the DSLAM*, Chapter 3, at telebyteusa.com/dslprimer/dslch3.htm, which is incorporated herein by reference in its entirety.

Current methods for connecting DSLAM switches in an ADSL network do not differentiate between batch provision requests and Graphic User Interface (GUI) operator initiated provision requests. Therefore, a GUI operator may have to wait an unacceptable amount of time (e.g., more than 20 minutes at times when there are a lot of batch provisioning orders) for their provision request to get through the DSLAM switch. Those skilled in the art will appreciate that a provision request is a request for supplying telecommunication services to one or more users, including the act of providing sufficient switching equipment.

DSLAM switches are network elements that are normally controlled by an Element Management System (EMS), such as for example an ALCATEL 5522 AWS Element Manager. One EMS can control up to hundreds of DSLAM switches, for example. A connection request on a DSLAM switch is made through an EMS. Normally only one gateway is provided between a Network Management System (NMS) and an EMS. This conventional architecture is limited to providing only one connection request being processed through an EMS, even though there may be many connection requests on different DSLAM switches at the same time.

Accordingly, there is a need in the art for an EMS to provide multiple gateways for communicating with a NMS and maximizing the utilization of the EMS and corresponding DSLAM switches controlled by the EMS. Conventional methods for managing DSLAM switch connections require that a control algorithm associated with the NMS process each connection request serially. Because each EMS can manage many DSLAM switches, when a connection request is made on the DSLAM switch there is a need to communicate to the same EMS that is trying to build up connections on other DSLAM switches distributed across the ADSL network. For nightly provisions, for example, there may be hundreds or thousands of installed connections going through the EMS to the DSLAM switches. Conventional control algorithms, however, only allow one connection to go through the EMS regardless of which DSLAM switch the connections are made to. For example, if five cross connections have to be made, then all five cross connections have to be queued into the EMS one by one. Accordingly, the NMS must wait until all five cross connections are queued into the EMS and until a first connection reaches its provision, a second connection cannot start trying to reach its provision.

A Permanent Virtual Circuit (PVC) is defined to provide a virtual circuit connection between a user's home and a network service provider. The PVC provides a connection that is equivalent of a dedicated private line service. Whenever a queued connection is sent to the proper DSLAM switch there is only one activity occurring in one of the PVCs established through the EMS. If two cross connection requests are sent concurrently to one DSLAM switch, however, the NMS will not know which response is associated with which connection request whenever the DSLAM switch sends a response back to the NMS. Further, sending two cross connection requests concurrently can actually cause trouble internally. One problem with using the conventional control algorithm is speed. Conventional control algorithms are very slow because only one connection can be made by the EMS through each DSLAM switch at any one time. For example, whenever two or three thousand PVCs are established in one day, the EMS must make an equivalent number of connections through each of the DSLAM switches. Accordingly, if multiple connections can be made through the EMS by a better control algorithm, overall system performance and throughput can be improved.

Another problem with conventional control algorithms is the use of automatic-batch provisioning when there are no users issuing commands and defining the several thousands of PVC provision requests. In other words, whenever, the system operates automatically. If a user, however, wants to issue a command to make a connection from a data center, the user will generally issue a provision request command from a GUI window. When the user issues the GUI command and there is traffic from other previously issued provision requests, then the user's provision request must wait in a queue until the GUI request can be processed. If there are other queued requests, for example, then a request from the user's GUI window will be placed in the back of the queue. The user, therefore, cannot get through until the other requests are processed. Because these other requests can number in the hundreds, the user must wait for an unacceptable amount of time. For example, in some conventional systems, the user can wait up to one half hour and even up to one hour before a GUI request is placed into the queue and is eventually connected to one of the dedicated DSLAM switches.

The problems described above exist with conventional NMS and EMS control algorithms because the NMS and EMS operate under what is generally referred to as semaphore control. Conventional semaphore control is implemental only at one level and it is not efficient because of its serial nature, allowing only one connection request to be processed at any one time. This serial processing creates two problems, for example. First, the throughput problem discussed above and, second, the GUI user problem whereby the GUI user is not given priority when the user's connection or provision request is sent. It may be difficult or impossible to actually surpass all the batch orders that may be queued before the GUI request. Therefore, there is a need for a GUI user's request to bypass all the batch orders and be processed with priority such that the GUI user can obtain a response relatively quickly.

Therefore there is a need for a new control algorithm for controlling a NMS and an EMS in a Digital Subscriber Line (DSL) network to solve the above-referenced problems. For example, there is a need to confirm multiple cross connections that are issued through the EMS to the multiple DSLAM switches. There is also a need to implement a two level semaphore control at the NMS level. For example, there is a need to provide one level of control at the DSLAM switch and another level of control at the EMS. There is also a need in the art for a method of supporting multiple gateways communicating with one EMS and enforced by an Object System Integrator (OSI) on a NMS platform.

SUMMARY

According to one aspect, the present invention provides a system for an ADSL access network for providing ADSL provision flow control at a DSLAM switch. The system includes an element management system in communication with a DSLAM switch; and a network management system in communication with the element management system, the network management system including a control algorithm for controlling ADSL provision flow on a DSLAM switch by introducing a two level semaphore including a first semaphore and a second semaphore; wherein the first semaphore controls a first provision request flow at the element management system level and the second semaphore controls a second provision request flow at the DSLAM switch level.

Another aspect of the present invention provides a method of providing ADSL provision flow control at a DSLAM switch. The method includes, at a DSLAM switch, receiving a provision request from a network management system; determining whether a DSLAM level semaphore is available at the DSLAM switch; determining whether an element management system level semaphore is available; and making a provision connection on the DSLAM switch via a NMS.

A further aspect of the present invention provides a method of providing ADSL provision flow control at a DSLAM switch. The method includes determining whether a provision request for a DSLAM switch was issued by a GUI operator; and resetting an attribute associated with the provision request made by the GUI operator.

BRIEF DESCRIPTION OF THE DRAWINGS

The present invention will be described in conjunction with the following figures, wherein.

DESCRIPTION

It is to be understood that the figures and descriptions of the present invention have been simplified to illustrate elements that are relevant for a clear understanding of the present invention, while eliminating, for purposes of clarity, other elements of a conventional nature. Furthermore, although the following description is based on an ADSL service network implementation, the same implementation can be applied to different types of Digital Subscriber Line (DSL) networks that enable different applications and serve differentiated markets such as Symmetrical DSL (SDSL) and Integrated Services Digital Network (ISDN) DSL (IDSL).

Figure 1:
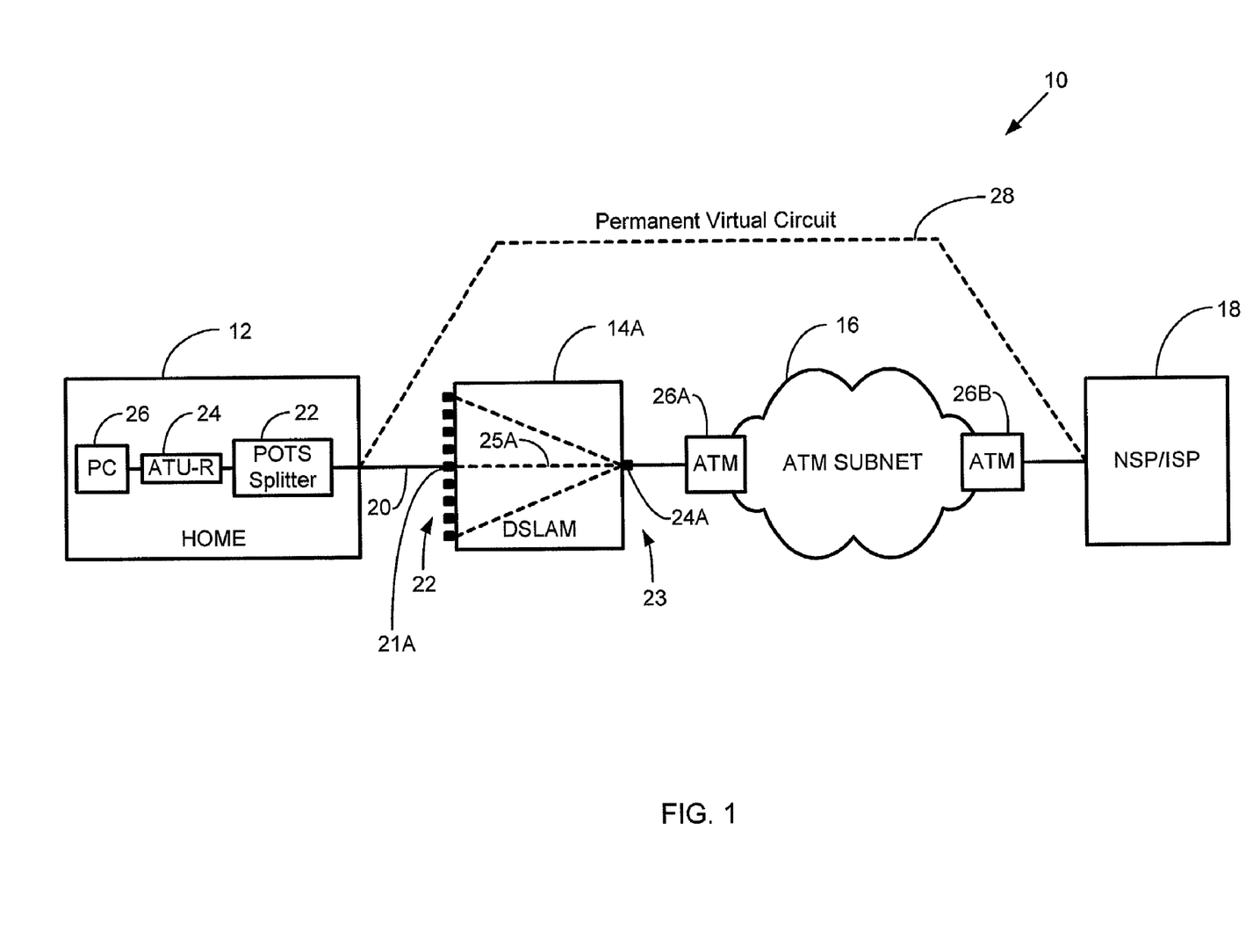
FIG. 1 illustrates one embodiment of an Asymmetric Digital Subscriber Line Network (ADSL) service network according to the present invention.

FIG. 1 illustrates one embodiment of an Asymmetric Digital Subscriber Line Network (ADSL) service network 10 comprising a user's home 12 in communication with a Digital Subscriber Line Access Multiplexer (DSLAM) switch 14A, which in turn is in communication with an Asynchronous Transfer Mode (ATM) sub network 16. The DSLAM switch 14A is provided by vendors such as ALCATEL. The ATM sub network 16 is in communication with a Network Service Provider (NSP) 18 such as an Internet Service Provider (ISP).

The user's home 12 is connected to the DSLAM 14A switch via an ADSL subscriber line 20. The user can access the ADSL subscriber line 20 via a personal computer (PC) 26 connected to an ATU-R device 24. The ATU-R device 24 is an ADSL transceiver unit for a remote location, i.e., the ATU-R device 24 resides in the user's home 12 rather than the telephone company's central office. The ATU-R device 24 is generally referred to as an ADSL modem. The ATU-R device 24 is a self-contained box that is suitable for customer use and generally includes a form of power supply, such as an AC adapter for power. In one embodiment, if the form of the ADSL subscriber line 20 permits the transmission of both analog and digital signals, the ATU-R unit 24 may be connected to a Plain Old Telephone Service (POTS) splitter 22 in order to separate the analog signals (e.g., voice) from the digital signals (e.g., high speed multimedia data). The POTS splitter 22 is the first device that an ADSL subscriber line 20 encounters when it arrives at the users' home 12. The POTS splitter 22 is connected to the DSLAM switch 14A via the ADSL subscriber line 20.

The DSLAM switch 14A has a first side 22 that includes a plurality of ADSL input ports 21A connected to a plurality of users' homes. Each user is assigned a unique ADSL input port. For example, 560 to 600 different users generally can be connected to the ADSL input ports 21A. All of the input ports 21A are aggregated into a single output port 24A on a second side 23 of the DSLAM switch 14A. The user can gather data or traffic through the physical ADSL line 20 connected between the user's home 12 and the DSLAM switch 14A via one of the ADSL ports 21A assigned to the user. The way to distinguish connections made by a plurality of users from the input side 22 to the output side 23 of the DSLAM switch 14A is by using a Virtual Path Identifier (VPI) or a Virtual Circuit Identifier (VCI).

In one embodiment, the second side 23 of the DSLAM switch 14A is connected to a first ATM switch 26A via the output port 24A. The ATM switch 26A provides a connection into the ATM sub network 16. A second ATM switch 26B provides a communication path from the ATM sub network 16 to the NSP/ISP 18. In one embodiment, one task of the ADSL service network 10 is to provision a Permanent Virtual Circuit (PVC) 28 connection between the user's home 12 and the NSP/ISP 18. One basic function of the DSLAM 14A switch, therefore, is to perform signal combination and fragmentation by collecting various digital signals from the plurality of users at the input ports 21A and combining the plurality of signals into a single aggregate signal at the output port 24A by way of multiplexing. The aggregate signal then travels through the ATM sub network 16 and onto the NSP/ISP 18, thus establishing a PVC 28 for each of the plurality of users connected to the DSLAM switch 14A.

Figure 2:
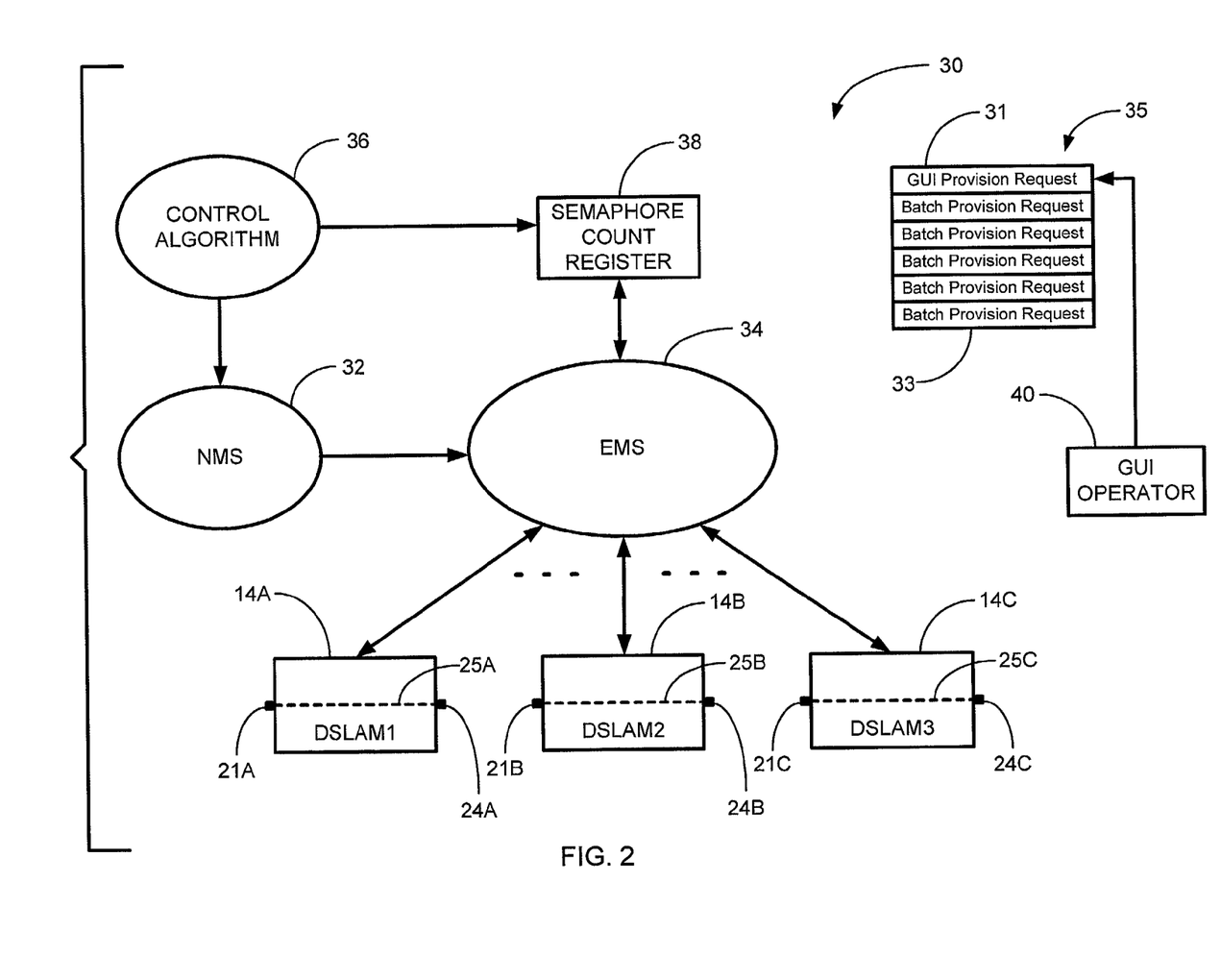
FIG. 2 illustrates one embodiment of a functional flow control diagram of an ADSL service network according to the present invention.

FIG. 2 illustrates one embodiment of a functional flow control diagram 30 of an ADSL service network 10. The flow control diagram 30 includes a first software program referred to as a Network Management System (NMS) 32 in communication with a second software program referred to as an Element Management System (EMS) 34. The EMS 34 is a software system that controls the hardware connection between the NMS 32 process and the one or more DSLAM switches 14A, B, C using information passed by the NMS 32 process. The function of the EMS 34 software is to set up connections to the DSLAM switches 14A, B, C, tear down the connections and perform configuration tasks. For example, the EMS 34 controls the setup and tear down of the connection 25A between ports 21A and 24A in the DSLAM switch 14A, the connection 25B between ports 21B and 24B in the DSLAM switch 14B, the connection 25C between ports 21C and 24C in the DSLAM switch 14C, and so on. Each connection from the input side 22 of the DSLAM switch 14A, B, C to the output side of the DSLAM switch 14A, B, C is uniquely identified for a user by using the VPI/VCI associated with each user. One EMS 34 can manage many DSLAM switches 14A, B, C. For example, one EMS 34 can manage over one hundred DSLAM switches 14A, B, C. In one embodiment the EMS 34 is an AWS ALCATEL 5522 made and sold by ALCATEL INCORPORATED.

In one embodiment, the NMS 32 process software communicates with the EMS 34 software. In turn, the EMS 34 software establishes communications with the one or more DSLAM switches 14A, B, C and relays information to the DSLAM switches 14A, B, C, passed by the NMS 32 process. As discussed above, the EMS 34 also establishes the connections between the input ports 21A, B, C and the output ports 24A, B, C of the DSLAM switches 14A, B, C. Once the connections are established at the DSLAM switches 14A, B, C the NMS 32 process moves to the ATM sub network 16 side and performs a similar connection process at the ATM switches 26A, B until the PVC 28 is provisioned from the user's home 12 to the NSP/ISP 18. The NMS 32 process performs control and monitoring functions for the ADSL service network 10. The NMS 32 process generally includes a control algorithm 36 module that performs the function of provisioning the PVC 28 between the user's home 12 and the NSP/ISP 18. Furthermore, the NMS 32 process establishes the connections through the ATM sub network 16 via the PVC 28.

Eventually, the NMS 32 process completes the connection process at the NSP/ISP 18 and thus provisions the PVC 28 for a specific user. The NMS 32 process builds the PVC 28 by creating objects for the connections 25A, B, C between the input ports 21A, B, C and the output ports 24A, B, C of the DSLAM switches 14A, B, C, respectively. The NMS 32 process then creates objects for the connection between the ATMs 26A, B of the ATM sub network 16. The NMS 32 process will then combine all of these objects into another object called the PVC 28 object and use the PVC 28 object to represent the user's connection between the ATU-R 24 and the NSP/ISP 18. Thousands of PVC 28 connections can be created in any given day.

In one embodiment the flow control diagram 30 for controlling the provisioning requests on the ADSL service network 10 includes a method in the form of a control algorithm 36 that can be executed by the NMS 32 process. The method for controlling provisioning requests can include a two level semaphore control process, for example. One semaphore is used to control the request flow at the EMS 34 level, while the other semaphore is used to control the request flow at the DSLAM switch 14A, B, C level. Accordingly, one embodiment of a method for providing ADSL provisioning flow control of multiple cross connections on the DSLAM switches 14A, B, C includes the implementation of the two level semaphore control by the NMS 32 process. Such a two level semaphore control process can be used to solve the ADSL service network 10 throughput problem discussed above.

When a provision request issued by the NMS 32 process for an available DSLAM switch 14A, B, C arrives at the EMS 34, the NMS 32 process checks if it can obtain a DSLAM level semaphore from the available DSLAM switch 14A, B, C on which the connection will be made. What enables the NMS 32 process to obtain the semaphore is the fact that the name of the DSLAM switch 14A, B, C on which the connection will be made is always provided with the connection request. Because only one connection request can be processed on any one DSLAM switch 14A, or 14B, or 14C, for example, if a prior connection request is currently being configured by the EMS 34 on the DSLAM switch 14A, the NMS 32 process will lock the DSLAM level semaphore on the DSLAM switch 14A and no other connection will be permitted on that DSLAM switch 14A. Those skilled in the art will appreciate that a similar process can be carried out for the DSLAM switches 14B or 14C. The DSLAM level semaphore is released once the connection is terminated and if a new connection request occurs at the DSLAM switch 14A, the released semaphore can be acquired by the DSLAM switch 14A. If a DSLAM level semaphore cannot be obtained at the time a connection request is made, the NMS 32 process will wait for a predetermined period (e.g., 10 or 20 seconds), then wake up and again check to see if the DSLAM level semaphore is available.

When the DSLAM switch 14A, or 14B, or 14C connection request is issued by the EMS 34, it is generally one of a multiple number of connection requests issued by the EMS 34. As will be appreciated by those skilled in the art, at any given time there can potentially exist thousands of connections and connection requests for the PVC 28 setup at the EMS 34. Accordingly, when the EMS 34 issues a connection request to a particular DSLAM switch 14A, B, C, the EMS 34 first determines whether it is processing another connection request issued by another DSLAM switch 14A, B, C. The EMS 34 generally keeps track of all such requests and if a connection request already exists for the particular DSLAM switch 14A, or B, or C, the NMS 32 process will go to sleep for a predetermined period, T, and will then wake up and check whether the first connection request is completed and has released the DSLAM level semaphore. For example, if a connection request is denied, the NMS 32 process will go to sleep for the predetermined period T, e.g., 10 to 20 seconds, and afterwards wake up and make another connection request to the EMS 34.

If the NMS 32 process does acquire a DSLAM level semaphore, the process then checks if it can acquire a corresponding EMS level semaphore. Because, the number of requests processed by each EMS 34 is a function of how many gateways the ADSL service network 10 provides for each EMS 34, only a limited number of connections is allowed on each EMS 32. Furthermore, the number of requests is limited because of performance related reasons. For example, if too many requests are permitted at the EMS 32 level, a request at the back of the process queue may take an extended period to finish. If the NMS 32 process can acquire an EMS level semaphore, the NMS 32 process will make the connection on the DSLAM switch 14A, or 14B, or 14C. Otherwise, the NMS 32 process frees up the DSLAM level semaphore and waits for a predetermined period (e.g., 10 to 25 seconds), before repeating the cycle. The NMS 32 then tries to acquire the DSLAM level semaphore and the EMS level semaphore. Using the EMS level semaphore improves the provision throughput because multiple provision requests issued by the NMS 32 process can then be processed on various DSLAM switches 14A, B, C. The two level semaphore control process implementation, however, still only permits one cross connection at any one time through any one of the DSLAM switches 14A, B, C.

In one embodiment, the two level semaphore control can be implemented using a multiple semaphore count register 38 that is accessible by the control algorithm 36. The multiple semaphore count register 38 tracks multiple cross connection requests issued by the NMS 32 process that can be processed concurrently by the EMS 34. For example, if the multiple semaphore count register 38 is set to three, then three concurrent cross connection requests can be processed concurrently by the EMS 34. Because only one cross connection can be processed at a time through a given DSLAM switch 14A, B, C, however, there is a need for the process to wait between the concurrent cross connection requests. For example, once a first connection request out of multiple connection requests is provisioned then a second connection request is started and so on. Those skilled in the art will appreciate that all cross connections can be started concurrently. To be made concurrently, however, the cross connections must be made on separate DSLAM switches 14A, B, C. Thus, the implementation of the multiple semaphore control method can increase system performance, e.g., throughput, many fold. For example, when the multiple semaphore count register 38 is set to three, the system throughput can be increased three times.

On the other hand, if there is no connection process executing at the time a connection request is issued by the NMS 32 process for a DSLAM switch 14A, or 14B, or 14C, the NMS 32 process will obtain a DSLAM level semaphore. The NMS 32 process will then lock the DSLAM level semaphore such that other cross connection requests for other DSLAM switches 14A, or 14B, or 14C cannot acquire the locked semaphore. After locking the semaphore, the NMS 32 process attempts to check the EMS 34 in order to obtain an EMS level semaphore because there cannot exist too many connections between the DSLAM switch 14A, B, C and the EMS 34. For example, allowing a large number of connections, e.g., 50 or 100, at that point can cause a timeout to occur for each connection request. Therefore, in order to prevent a jam of too many requests at the EMS 34 level, the EMS level semaphores are counted for controlling the total number of connection requests at the EMS 34 level. Once the EMS 34 receives a connection request and after the NMS 32 process checks the requested DSLAM switch 14A, B, C for an available DSLAM level semaphore, the NMS 32 process can proceed to obtain an EMS level semaphore. The NMS 32 process then continues to check whether a semaphore is available at the DSLAM switch 14A, B, C. If the semaphore count register 38 holds a value that is less than a predetermined value, the NMS 32 process continues to check for a semaphore at that level.

Accordingly, if the semaphore count stored in the multiple semaphore count register 38 is less than a predetermined value at the time it is checked, the NMS 32 process can proceed to make the cross connection between the EMS 34 and one of the DSLAM switches 14A, B, C requested. Once the NMS 32 process obtains an EMS level semaphore the multiple semaphore count register 38 is incremented by one in order to reflect the situation at the EMS 32 queue 35. Accordingly, by implementing the two level semaphore control, the NMS 32 process can input as many connections as possible through the multiple DSLAM switches 14A, B, C at the same time. Once the connection is terminated, the NMS 32 process frees up and unlocks the DSLAM level semaphore and decrements the multiple semaphore count register 38 to tell the EMS 34 that the connection has been terminated and the EMS/DSLAM connection process is completed. The NMS 32 process then moves to the ATM sub network 16 for processing similar connection requests at the ATM switches 26A, B.

The multiple semaphore count register 38 can be set to three, five or any other predetermined value, whereby the ADSL service network 10 can realize a threefold, fivefold or other predetermined increase in throughput over conventional provisioning methods. Those skilled in the art will appreciate that the increase in throughput can be realized for the number of gateways that are available. For example, from a practical standpoint, when provisioning thousands of PVC 28 connections on a daily basis, the increase in throughput amounts to a substantial savings in time. For example, for 1,000 daily PVC 28 connections a conventional provisioning method may require up to five or six hours to complete the provisioning process. Therefore, if the provisioning process begins at midnight, it would not be completed until about 6 a.m. Using the two level semaphore control method described above, however, the provisioning process for making the 1,000 PVC 28 connections requires only about one hour, if six gateways are used.

In one embodiment the method according to the present invention provides an object or a numeric value representing one aspect of a managed network device. In one embodiment, the method provides an object representing that a GUI operator 40 is requesting activity on the ADSL service network 10.

The method also provides several parameters or units of information. First, for illustration purposes, one parameter is referred to as Batch_Sleep_Time and represents the NMS 32 process "sleep" time if a batch provision request 33 cannot obtain a semaphore because another process is already being executed. Second, for illustration purposes, another parameter is referred to as GUI_Sleep_Time and represents the NMS 32 process "sleep" time if a GUI provision request 31 cannot obtain a semaphore because a batch provision process is already being executed. In another embodiment the process provides a variable referred to as GUI_Spin_Time that represents a GUI operator provision request 31. For illustration purposes, a parameter representing a previous GUI operator provision request 31 is referred to as GUI_Last_Spin_Time.

When the GUI operator 40 issues a GUI provision request 31 for a first DSLAM switch 14A, or 14B, or 14C, that GUI provision request 31 is marked as being issued by the GUI operator 40. For example, when the GUI operator's 40 GUI provision request 31 arrives at the first DSLAM switch 14A, through the EMS 34, the NMS 32 process attempts to obtain a DSLAM level semaphore or an EMS level semaphore. At that time, the NMS 32 process sets the current time for the GUI_Last_Spin_Time and it does not matter whether or not the GUI operator 40 can obtain either semaphore. This provides an indication that a current GUI request has arrived. In most cases, if there are many batch orders being processed, the DSLAM switch 14A, B, C will not be available and the NMS 32 GUI process cannot obtain a DSLAM level semaphore. If the NMS 32 process cannot obtain a DSLAM level semaphore, it goes to sleep for a period of time defined by the parameter GUI_Spin_Time (e.g., 10 sec.) that is less than the period of time defined by the parameter Batch_Sleep_Time (e.g., 30 sec.), which represents the batch sleeping period for a batch connection request that cannot obtain a semaphore. In the example described above, the NMS 32 GUI process will sleep for about 10 seconds instead of about 30 seconds, such that the NMS 32 process can wake up more frequently and check the availability of DSLAM level semaphores. Also, when batch process arrives, it will compare the current time with the GUI_Last_Spin_Time, and if the difference is big enough, for example 10 minutes, it means that the last GUI order must have arrived 10 minutes early so it must finish at a normal processing speed. If the difference is small, for example less than 30 seconds, it means that the GUI order probably has not yet finished and the batch order can go to sleep and provide a graceful waiting period before rejoining the competition process for available semaphores.

In one embodiment, the provisioning process control algorithm 36 sets a flag for determining whether a provision request is a GUI provision request 31 or a batch provision request 33. If the provision request is a GUI provision request 31, when the NMS 32 process attempts to acquire a semaphore it will reset the object GUI_Last_Spin_Time to indicate that there is some GUI activity on the ADSL service network 10. If the request is a batch provision request 33, the NMS 32 process first checks to see if any GUI provision requests 31 are present. The process checks for the presence of GUI provision requests 31 by subtracting the value of GUI_Last_Spin_Time from the value of the current Time. If the result is greater than a predetermined time, e.g., 30 seconds or more, then the process determines that there are no GUI provision requests 31 for the requested DSLAM switch 14A, B, C or the EMS 34. Accordingly, the batch provision request 33 is free to acquire either the DSLAM level or the EMS level semaphores or both. Otherwise, the NMS 32 process will go to sleep for a period defined by the object Batch_Sleep_Time, then wake up and check to see if it can compete for the DSLAM level and EMS level semaphores at a later time. By following the process described above, a GUI provision request 31 is given high priority over a batch provision request 33. If both a batch provision request 33 and a GUI provision request 31 arrive concurrently, the GUI provision request 31 will be given high priority, and in turn it will have a much greater chance of acquiring the DSLAM level or EMS level semaphores than the batch provision request 33.

When there is some GUI provision request on the ADSL service network 10, the NMS 32 determines whether these GUI requests can acquire semaphores on any one of the DSLAM switch 14A, or 14B, or 14C. When a GUI request competes with a semaphore, it will set the parameter GUI_Last_Spin_Time to the current Time. If another GUI request tries to acquire the semaphore, it will again update the parameter GUI_Last_Spin_Time to the latest current Time. Accordingly, the parameter GUI_Last_Spin_Time is continuously updated to the latest current Time by the latest GUI provision request. Accordingly, if a batch provision request arrives, for example at time T1, depending on the difference "T1−GUI_Last_Spin_Time," the batch order may or may not be permitted to compete for the DSLAM level semaphores. More specifically, if the difference is less than one minute, the batch order is not allowed to compete for a semaphore, but rather the NMS 32 will force the order process to go to sleep for a batch sleep time period. If the difference is more than one minute, however, the batch order is permitted to compete for a semaphore, and once it can acquire the semaphore, it can proceed to make the connection request on the DSLAM switch 14A, or 14B, or 14C.

If there are no GUI provision requests 31 coming, the new current Time minus the GUI_Last_Spin_Time will be greater than the predetermined time interval (e.g., one minute). Accordingly, when this condition is true the NMS 32 process will process a current batch provision request 33 because there is a high probability that there will not be any GUI provision requests 31 being issued in the near future. The NMS 32 process then proceeds to compete for available semaphores at that location.

Because all of the requests issued by the GUI operator 40 are processed within the NMS 32, the GUI operator 40 is permitted to set the GUI_Last_Spin_Time in the NMS 32 every time a GUI provision request 31 is issued. The batch order is permitted to check the GUI_Last_Spin_Time to see whether within a certain time period (e.g., 10 minutes), there has been a GUI provision request 31 issued. If there has not been a GUI provision request 31 issued, the NMS 32 process will proceed to make the connection, otherwise the NMS 32 process will let the batch order go to sleep. This method provides a fast response to the GUI operator 40 who will now have to wait only a fraction of the time for a connection as compared to the conventional method described above.

Figure 3:
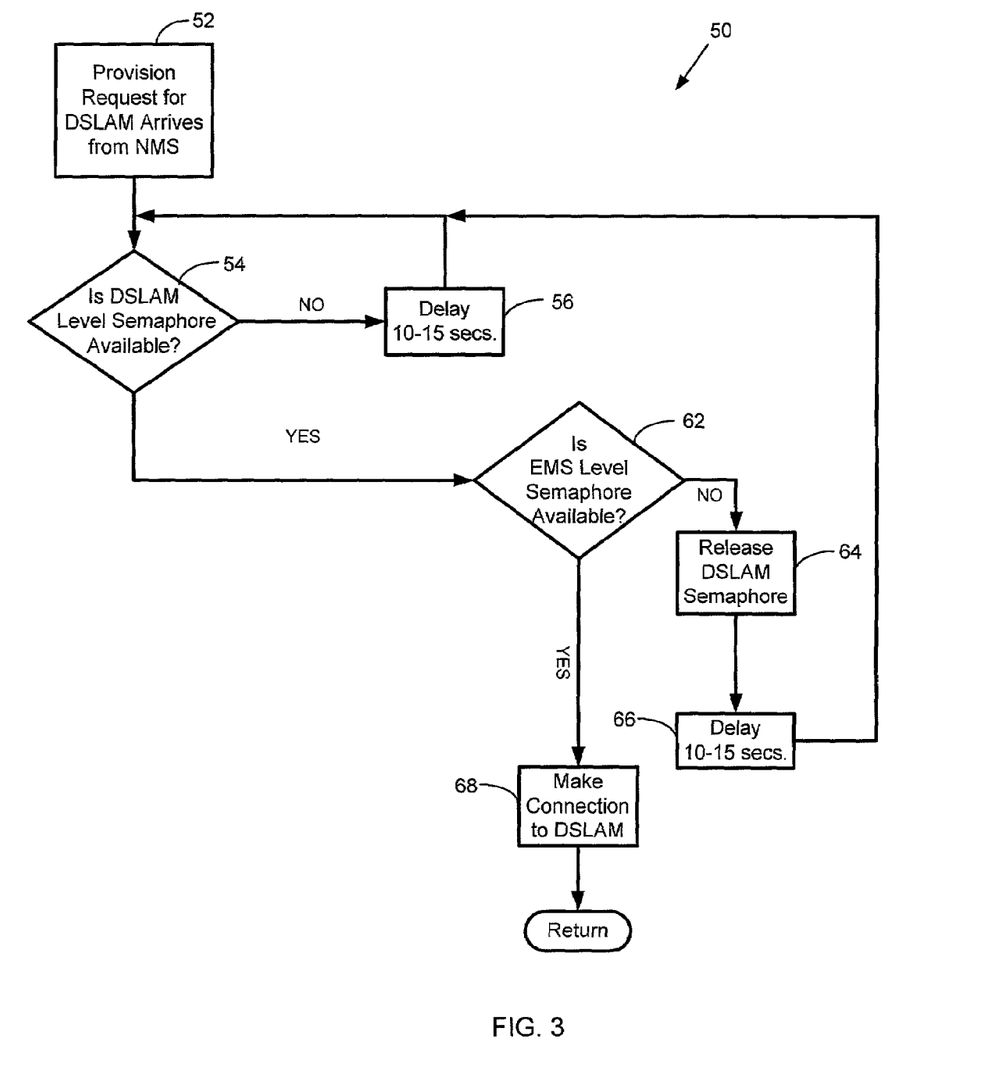
FIG. 3 illustrates one embodiment of a logic flow diagram of a control algorithm according to the present invention.

Turning now to FIG. 3 where one embodiment of a logic flow diagram 50 of the control algorithm 36 is illustrated. In one embodiment the control algorithm 36 can be implemented in the form of computer instructions executed by the NMS 32 process. Although the control algorithm 36 can be implemented in the form of computer instructions it also can be implemented in the form of fixed or programmable logic arrays. In one embodiment, the control algorithm 36 is developed on a platform generally provided by one or more Object System Integrators (OSI).

The logic flow diagram 50 is one embodiment of a two level semaphore control method described above for improving the throughput of provisioning requests on the ADSL service network 10. Accordingly, at block 52 a provision request is issued by the NMS 32 process to the EMS 34 and onto one of the many DSLAM switches 14A, B, C distributed throughout the ADSL service network 10 in communication with the EMS 34.

At decision block 54, the process determines whether a DSLAM level semaphore is available. If not, the provision order goes to sleep, e.g., enters a delay loop 56, and then continues back to decision block 54 to see if the DSLAM level semaphore is ready. In one embodiment, the delay loop 56 is about 10-15 seconds. Once the DSLAM level semaphore becomes available the process continues at decision block 62 where it determines whether an EMS level semaphore is available. If an EMS level semaphore is available a connection to the DSLAM switch 14A is made at block 68. If an EMS level semaphore is not available, the DSLAM level semaphore is released at block 64, enters a delay loop at block 66, then once again tries to obtain a DSLAM level semaphore at block 54.

Figure 4:
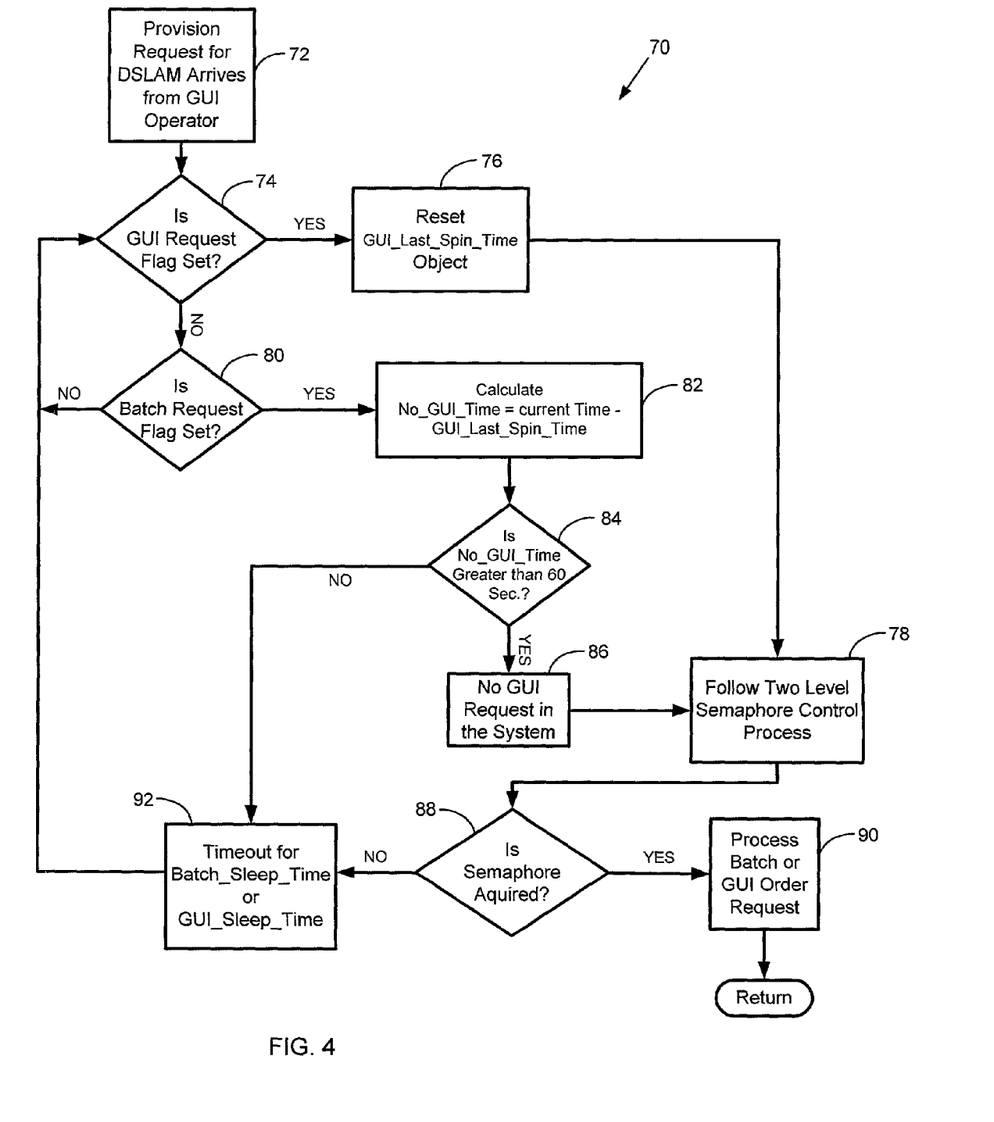
FIG. 4 illustrates one embodiment of a logic flow diagram of a control algorithm according to the present invention.

FIG. 4 illustrates one embodiment of a logic flow diagram 70 of a control algorithm for processing a GUI operator 40 request for a DSLAM switch. Accordingly, at block 72 a provision request for a DSLAM switch 14A, B, C is issued by the GUI operator 40. At decision block 74, the process determines whether a GUI provision request 31 flag is set. If the GUI provision request 31 flag is set, at block 76 the process resets the GUI_Last_Spin_Time object and proceeds to block 78 where the process follows the two level semaphore control process described with reference to logic flow diagram 50 illustrated in FIG. 3.

If the GUI request flag is not set, the batch request flag is set at decision block 80. If the batch request flag is set, the process continues at block 82 where it calculates:

No_GUI_Time=current Time−GUI_Last_Spin_Time.

At block 84 the process determines whether the value of No_GUI_Time obtained by subtracting GUI_Last_Spin_Time from the current Time is greater than a predetermined value such as, for example, 60 seconds. If the value is greater than the predetermined value, at block 86 the process assumes that there is no GUI request in the system and proceeds to block 78 where the process follows the two level semaphore control. The process continues to decision block 88, where it determines whether a semaphore can be acquired by either the batch order or the GUI order. If a semaphore was acquired by either one, at block 90 the batch or GUI order request is processed. Otherwise, the process continues at block 92 where it goes to sleep and times out for a period equal to Batch_Sleep_Time if a batch order was processed or for GUI_Sleep_Time if a GUI order was processed.

The foregoing description of the specific embodiments of the various embodiments of the invention has been presented for the purpose of illustration and description. It is not intended to be exhaustive or to limit the investigation to the precise form disclosed. Many modifications and variations are possible in light of the above teachings. It is intended that the scope of the invention be limited not with the description above but rather by the claims appended hereto.

What is claimed is:

1. A system for an asymmetric digital subscriber line (ADSL) access network for providing ADSL provision flow control at a digital subscriber line access multiplexer (DSLAM) switch, comprising:
   a network management system in communication with an element management system that is in communication with the DSLAM switch, the network management system including a control algorithm for controlling ADSL provision flow on a DSLAM switch by introducing a two level semaphore including a first semaphore and a second semaphore;
   a first object defined by the network management system for representing that a batch process is requesting activity on the DSLAM switch; and
   a second object defined by the network management system for representing that a graphic user interface (GUI) operator is requesting activity on the DSLAM switch wherein a request of the GUI operator bypasses requests of the batch process and is processed with priority;
   wherein the first semaphore controls a first provision request flow at the element management system level and the second semaphore controls a second provision request flow at the DSLAM switch level.

2. The system according to claim 1, further comprising the element management system in communication with the DSLAM switch.

3. The system according to claim 2, further comprising at least one of the following:
   a plurality of DSLAM switches in communication with the element management system; and
   a semaphore count register in communication with the control algorithm.

4. A system for an asymmetric digital subscriber line (ADSL) access network for providing ADSL provision flow control at a digital subscriber line access multiplexer (DSLAM) switch, comprising:
   means for managing an ADSL access network element in communication with means for multiplexing an ADSL subscriber line and in communication with means for managing the ADSL access network; and
   at least one of the following:
      the means for multiplexing the ADSL subscriber line;
      the means for managing the ADSL access network; and
      means for tracking a semaphore in communication with a control algorithm;
   wherein the means for managing the ADSL access network includes means for controlling ADSL provision flow on a DSLAM switch by introducing a two level semaphore including a first semaphore and a second semaphore;
   wherein the first semaphore controls a first provision request flow at the means for managing the ADSL network element level and the second semaphore controls a second provision request flow at the means for multiplexing level; and
   wherein the system includes the means for managing the ADSL access network further comprising a first object whose attribute is defined by the means for managing the ADSL access network for representing that a batch process is requesting activity on the means for multiplexing the ADSL subscriber line and a second object whose attribute is defined by the means for managing the ADSL access network for representing that a GUI operator is requesting activity on the means for multiplexing the ADSL subscriber line wherein a request of the GUI operator bypasses requests of the batch process and is processed with priority.

5. The system according to claim 4, further comprising a plurality of means for multiplexing an ADSL subscriber line in communication with the means for managing an ADSL access network element.

6. A method of providing asymmetric digital subscriber line (ADSL) provision flow control at a digital subscriber line access multiplexer (DSLAM) switch, comprising:
   sending a provision request from a network management system to a DSLAM switch;

determining whether a DSLAM level semaphore is available at the DSLAM switch;
delaying when the DSLAM level semaphore is not available wherein the delaying is different between a GUI order and a batch order;
determining whether an element management system level semaphore is available; and
connecting the network management system to the DSLAM switch;
wherein the GUI order bypasses the batch order and is processed with priority.

7. The method according to claim 6, wherein delaying comprises delaying the provision request via a delay loop for 10-15 seconds.

8. The method according to claim 6, further comprising determining whether a connection is being configured on a corresponding DSLAM switch when the DSLAM level semaphore is available at the DSLAM switch.

9. The method according to claim 8, further comprising locking the DSLAM level semaphore to the DSLAM switch when a connection is being configured on the DSLAM.

10. The method according to claim 8, further comprising blocking other connection requests on the DSLAM switch when a connection request is being configured on the DSLAM switch.

11. The method according to claim 6, further comprising releasing the DSLAM level semaphore when the element management system semaphore is not available.

12. The method according to claim 11, further comprising delaying after releasing the DSLAM level semaphore.

13. The method according to claim 12, wherein delaying comprises delaying for 10-15 seconds.

14. A method of providing asymmetric digital subscriber line (ADSL) provision flow control at a digital subscriber line access multiplexer (DSLAM) switch, comprising:
determining whether a provision request for a DSLAM switch was issued by a GUI operator;
resetting an attribute associated with the provision request made by the GUI operator;
determining whether a batch provision request acquired a semaphore; and
delaying for a predetermined period when the batch provision request does not acquire the semaphore;
wherein the provision request issued by the GUI operator bypasses the batch provision request and is processed with priority.

15. The method according to claim 14, wherein resetting an attribute comprises resetting an object associated with the provision request made by the GUI operator.

16. The method according to claim 14, wherein determining whether a provision request was issued by a GUI operator comprises determining whether a GUI request flag is set.

17. The method according to claim 14, further comprising determining whether there is a batch process provision request when there is no provision request for a DSLAM switch issued by the GUI operator.

18. The method according to claim 17, wherein determining whether a provision request was issued by a batch process comprise determining whether a batch request flag is set.

19. The method according to claim 14, further comprising processing the batch provision request.

20. A computer-readable storage medium having computer-readable instructions which, when executed on a computer will cause the computer to perform a method of providing asymmetric digital subscriber line (ADSL) provision flow control at a digital subscriber line access multiplexer (DSLAM) switch, the method comprising:

sending a provision request to the DSLAM switch to establish a virtual circuit;
determining whether a DSLAM level semaphore is available at the DSLAM switch;
determining whether an element management system level semaphore is available;
connecting a network management system to the DSLAM switch in response to the DSLAM level semaphore and the element management system level semaphore being available; and
delaying when the DSLAM level semaphore is not available;
wherein, when the provision request comprises a request of a GUI operator, the request of the GUI operator is processed with priority and bypasses requests of a batch process.

21. The computer-readable storage medium according to claim 20 further comprising determining whether a connection is being configured on a corresponding DSLAM switch when the DSLAM level semaphore is available at the DSLAM switch.

22. A system for an asymmetric digital subscriber line (ADSL) access network for providing ADSL provision flow control at a digital subscriber line access multiplexer (DSLAM) switch, comprising:
a network management system in communication with an element management system that is in communication with the DSLAM switch, the network management system including a control algorithm for controlling ADSL provision flow on a DSLAM switch by introducing a two level semaphore including a first semaphore and a second semaphore; and
an object defined by the network management system for representing that a batch process is requesting activity on the DSLAM switch;
wherein the first semaphore controls a first provision request flow at the element management system level and the second semaphore controls a second provision request flow at the DSLAM switch level.

23. A system for an asymmetric digital subscriber line (ADSL) access network for providing ADSL provision flow control at a digital subscriber line access multiplexer (DSLAM) switch, comprising:
means for managing an ADSL access network element in communication with means for multiplexing an ADSL subscriber line and in communication with means for managing the ADSL access network; and
at least one of the following:
the means for multiplexing the ADSL subscriber line;
the means for managing the ADSL access network; and
means for tracking a semaphore in communication with a control algorithm;
wherein the means for managing the ADSL access network includes means for controlling ADSL provision flow on a DSLAM switch by introducing a two level semaphore including a first semaphore and a second semaphore;
wherein the first semaphore controls a first provision request flow at the means for managing the ADSL network element level and the second semaphore controls a second provision request flow at the means for multiplexing level; and
wherein the system includes the means for managing the ADSL access network further comprising an object whose attribute is defined by the means for managing the ADSL access network for representing that a batch process is requesting activity on the means for multiplexing the ADSL subscriber line.

* * * * *